Jan. 27, 1931.  D. C. McCARTHY  1,790,589
DOUGH FORMING MACHINE
Filed Feb. 13, 1928   3 Sheets-Sheet 3
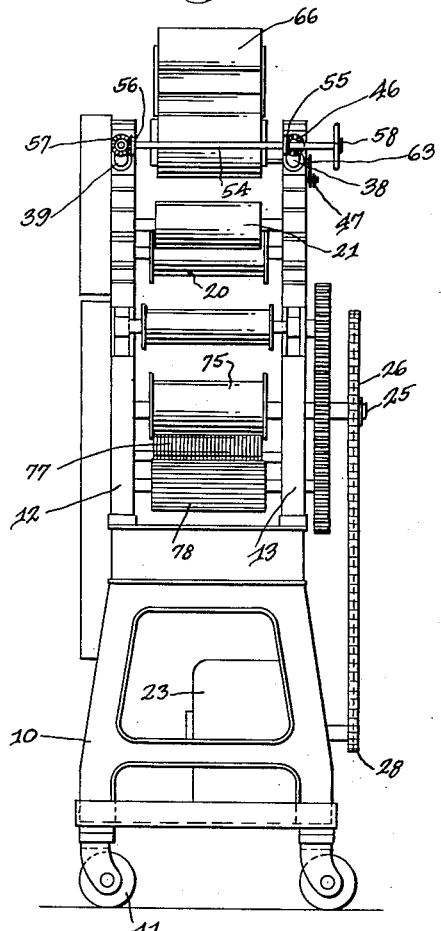
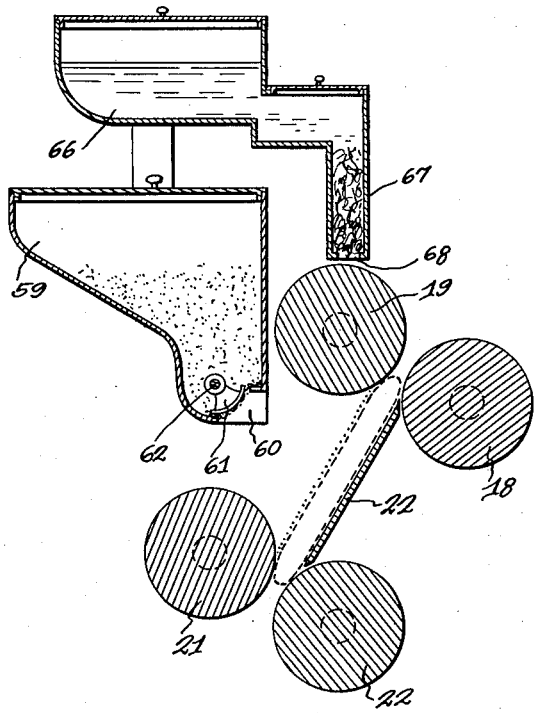
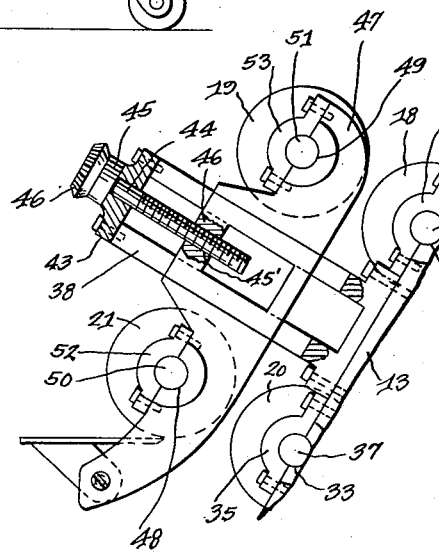
Daniel C. McCarthy
INVENTOR
BY Victor J. Evans
ATTORNEY Patented Jan. 27, 1931

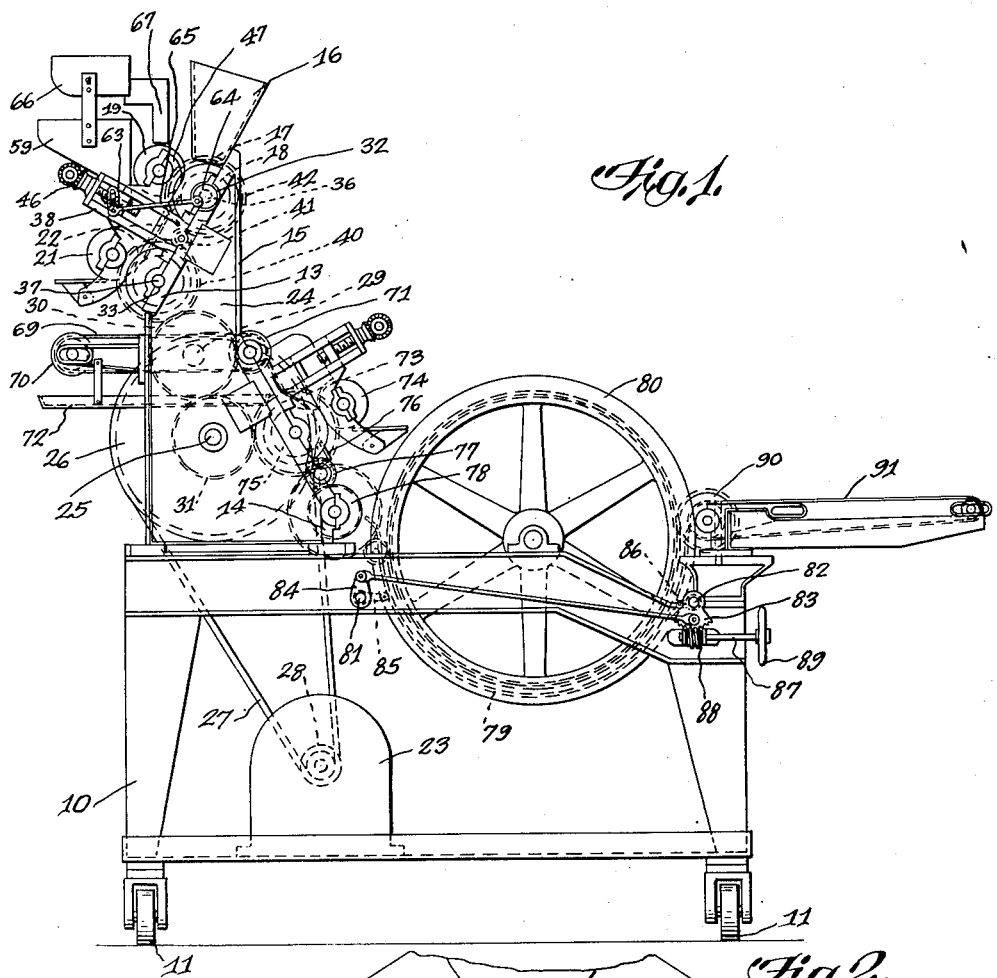

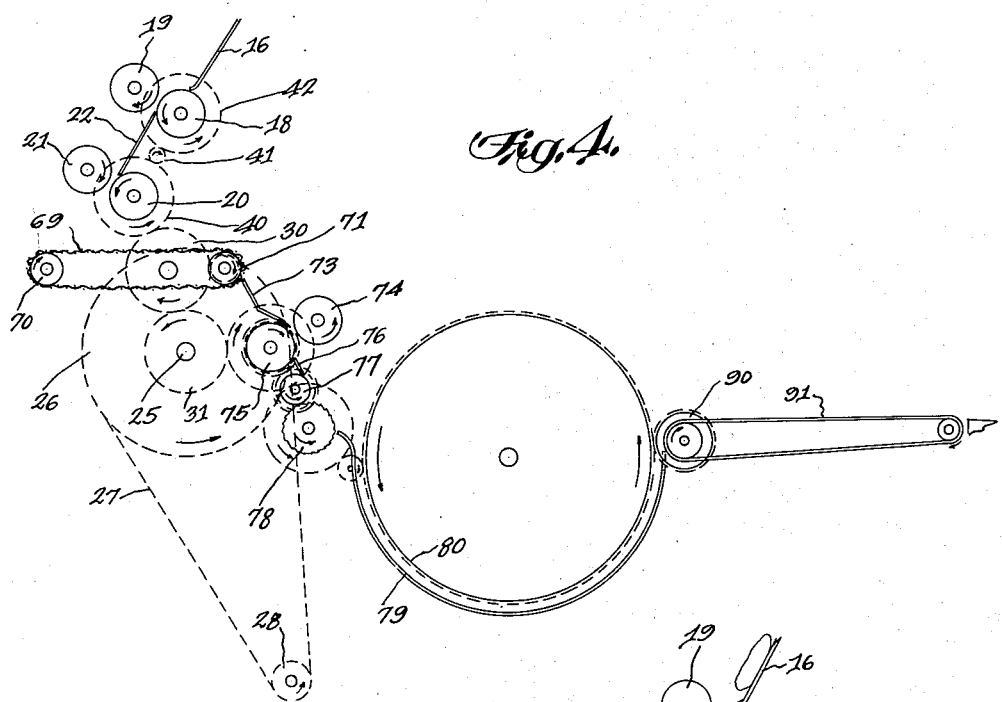
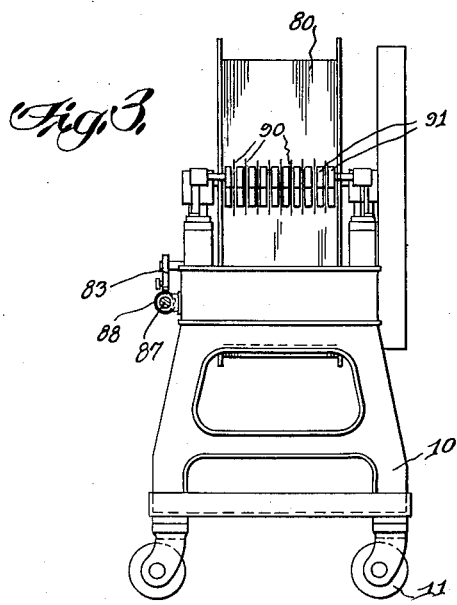
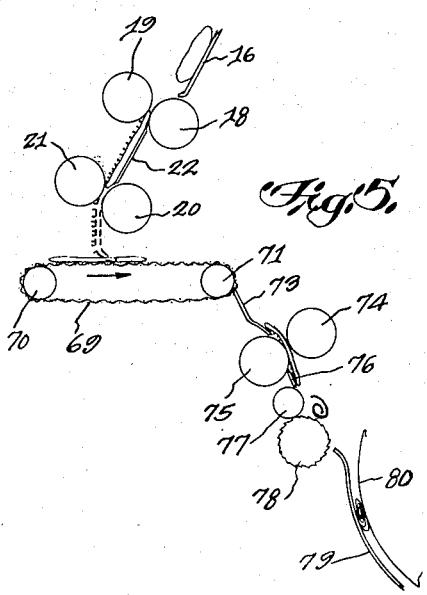

1,790,589

UNITED STATES PATENT OFFICE

DANIEL C. McCARTHY, OF CHICAGO, ILLINOIS

DOUGH-FORMING MACHINE

Application filed February 13, 1928. Serial No. 254,053.

This invention relates to certain novel improvements in dough forming machines and is particularly directed to an apparatus for making of rolls and the like.

The salient object of my invention is to provide a device of the foregoing character which will embody an arrangement whereby a plurality of rolls may be formed during a given operation of the machine.

Another object of the invention is to provide a device of the foregoing character in which a flavoring composition may be introduced onto the dough such that when the dough is formed into a roll or the like said flavoring composition will be deposited interiorly of the rolled portions thereof.

A further object of the invention is to arrange a device of the foregoing character such that the size of the product produced thereby may be varied.

A still further object of the invention is to provide a device of the foregoing character which will be simple and positive in operation and economical to manufacture.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a machine embodying a preferred form of construction for my invention;

Fig. 2 is a fragmental detail view depicting portions of the adjustable mechanisms employed in the final stage of the roll forming operation;

Fig. 3 is an end elevational view of the device at the delivery end thereof;

Fig. 4 is a partially diagrammatical view illustrating the mechanisms employed in the roll forming operation;

Fig. 5 is a diagrammatical view depicting the various steps in the roll forming operation;

Fig. 6 is an end elevational view looking in the opposite direction from Fig. 3;

Fig. 7 is a fragmental sectional detail view depicting the mechanisms employed to introduce the flavoring composition into the dough as well as a means for preventing the dough adhering to the forming members; and Fig. 8 is a fragmental detail view depicting the construction of the first stage forming members.

My improved construction which is illustrated in the accompanying drawings including a frame 10 which is preferably mounted on castors 11 so as to be readily transportable. To the upper end of the frame 10 adjacent one end thereof supporting elements 12 and 13 are secured which extend upwardly. At a point spaced below the upper ends of the elements 12 and 13 said elements are angled toward the machine as illustrated in Fig. 1. At a point spaced from the supporting elements 12 and 13 on the frame 10 other supporting elements such as that indicated by 14 in the drawings, extend upwardly for a short distance and are then angled toward the supporting elements 12 and 13 and bracing members such as those indicated by 15 extend between the ends of the supporting elements 12 and 13 and those indicated by 14. Thus a rigid upwardly extending structure is provided on which the roll forming mechanisms are mounted.

Secured to the upper end of the supporting elements 13 and 12 is a dough receiving chamber 16 which in the present instance is adapted to receive a predetermined amount of dough but which, if desired, may be arranged to receive a continuous stream of dough and also include a means whereby a predetermined amount of the dough may be severed from the continuous supply. As illustrated in Fig. 1 the dough receiving chamber 16 tapers downwardly so as to have a restricted opening at the lower end thereof which is indicated by 17 in the drawings.

In Fig. 4 the dough receiving chamber is indicated by the guide member 16 and it may be seen that this guide member is adapted to direct dough passing through the opening 17 on to forming rollers which are disposed in sets indicated by 18 and 19 and 20 and 21 which comprise the first stage in the forming operation. A guide plate 22 is disposed between the sets of forming rollers as illustrated in Figs. 1 and 4.

In order to drive the forming rollers the following mechanisms are provided. A suitable motive means such as the electric motor 23 is provided which is mounted on the lower portion of the frame 10. Suitable plates are secured between the upwardly extending supporting elements heretofore described, one of said plates being indicated by 24 in the drawing. Bearings are provided in the plates in which a shaft 25 is mounted on which a power receiving pulley 26 is secured. A band 27 connects the power receiving pulley 26 to the power supplying pulley 28 that is mounted on the shaft of the motor 23. A shaft 29 is journaled in the plates 24 and a gear 30 is fixed thereon which is adapted to mesh with a gear 31 mounted on the shaft 25. On the angled portion of the supporting elements 12 and 13 bearings such as those indicated by 32 and 33 in Fig. 8 are provided and removable bearing caps 34 and 35 cooperate with the bearings 32 and 33 so as to rotatably journal shafts 36 and 37 therein. Mounted on the shafts 36 and 37 are the forming rollers 18 and 20. As best illustrated in Fig. 1 a gear 40 is mounted on the shaft 37 which meshes with the gear 30 and also with a pinion 41 that is mounted on a shaft that is suitably supported by the angled portions of the supporting elements 12 and 13. A gear 42 is mounted on the shaft 36 and meshes with the pinion 41.

When motor 23 drives pulley 28 the rotary movement thereof is transmitted to pulley 26 through belt 27 and thus the shaft 25 is rotated. This drives gear 31 and therefore gear 30 which acts on gear 40 to rotate forming roller 20 in the direction illustrated by the arrow in Fig. 4. Gear 40 also drives pinion 41 which meshes with gear 42 which drives forming roller 18. Since the pinion 41 is interposed between gears 40 and 42, it is apparent that the forming rollers carried by the shafts on which said gears are mounted will be driven in the same direction as indicated by the arrows in Fig. 4.

It has been stated that the forming rollers are disposed in sets and the rollers 19 and 21 which are adapted to respectively cooperate with the rollers 18 and 20 are mounted in a manner now to be described. As best illustrated in Fig. 8 a bracket 38 is secured to the angled portion of the supporting element 13 and a similar bracket 39 is secured to the supporting element 12. These brackets are disposed at right angles to the angled portion of the supporting elements 12 and 13. In the removable outer end 43 of the bracket 38 a shaft 44 is journaled. On the outer end of the shaft 44 a collar 45 is fixed which has a bevel gear 46 formed thereon. The inner end of the shaft 44 is screw threaded and is adapted to engage the screw threads in the opening 45′ provided in the portion 46 of the supporting shoe 47. The formation of the supporting shoe 47 is best illustrated in Fig. 8. The supporting shoe 47 has bearings 48 and 49 provided therein and shafts 50 and 51 are journaled in these bearings and are retained therein by the removable bearing caps 52 and 53. The forming roller 19 is mounted on the shaft 51 and the forming roller 21 is mounted on the shaft 50. Suitably supported from the supporting elements 12 and 13 is a shaft 54 which has bevel gears 55 and 56 thereon. The bevel gear 55 is adapted to mesh with the bevel gear 46 on the bracket 38 and the bevel gear 56 is adapted to mesh with the bevel gear 57, mounted on the bracket 39 in the same manner as the bevel gear 46 is mounted on the bracket 38. A hand wheel 58 is provided on the shaft 54 by which said shaft may be rotated and the rotation of said shaft is translated to the shafts 44 in the brackets 38 and 39 so as to move the supporting shoes 47 and therefore the rollers 21 and 19 toward and away from the rollers 20 and 18 so as to vary the space therebetween and thus regulate the size of the quantity of dough to be passed therebetween.

At the time the quantity of dough or as it is called in the art, the loaf, is passing over the guide plate 22 it is sometimes desired to coat the loaf with a seasoning material such as cinnamon or the like. I therefore provide a container 59 which is supported from the supporting elements 12 and 13 in any approved manner. This container is shaped as best shown in Fig. 7 and includes a discharge opening 60, passage through which is controlled by the rockable door 61 that is mounted on the shaft 62. As is best shown in Fig. 1, shaft 62 has a connecting fork 63 mounted on one end thereof. A wheel 64 is mounted on the shaft 36 and a link 65 is eccentrically connected to said wheel and said link is also connected to the connecting fork 63. This construction is such that when the shaft 36 is rotated the shaft 62 will be oscillated so as to rock the door 61 to and from closing position. Mounted above the container 59 is a container 66 which is adapted to contain a suitable lubricating fluid. The container 66 has a neck portion 67 which includes a discharge opening 68 which is disposed above the roller 19. The portion 67 is filled with suitable porous material so that the fluid in the container 66 may pass therethrough and out through the opening 68 onto the roller 19.

When the loaf passes between the rollers 18 and 19 it is flattened and the lubricating fluid prevents the dough adhering to the rollers. At the time the loaf is passing along the guide board 22 door 61 is open so as to disclose the discharge opening 60 which permits the material in the container 59 to fall upon the loaf and coat one surface thereof as shown in Figs. 5 and 7 in which the loaf is shown in dotted lines and in which the material on one face of the loaf is illustrated by dots. The loaf then passes between the rollers 21 and 22.

After passing from the rollers 20 and 21 the loaf falls upon the chain belt 69 which carries the loaf toward the curling mechanism now to be described. The chain belt travels over the pulleys 70 and 71 which are driven from the shaft 25 in any approved manner. The chain belt 69 is preferably of porous construction and any loose material from the container 59 on the loaf will fall through this chain belt into the pan 72 provided therebelow as illustrated in Fig. 1.

After passing from the chain belt 69 the loaf is guided by the guide member 73 into the forming rollers 74 and 75. The roller 74 is mounted in the same manner as the rollers 19 and 21 in order that said roller may be adjusted relative to the roller 75 in order to regulate the thickness of the loaf. The rollers 74 and 75 are driven from the shaft 25 by a suitable gear train.

After passing from the rollers 74 and 75 the loaf is guided by the guide member 76 onto a scored roller 77 which is of reduced size relative to a notched roller 78. The rollers 77 and 78 are disposed in the manner best illustrated in Fig. 4 and as indicated by the arrows thereon said rollers are adapted to rotate in the same direction. As illustrated in Fig. 5 the loaf passes over the roller 77 and engages the larger roller 78 and is curled or rolled upon itself so as to form a socalled roll. It is apparent that the loaf falls upon the belt 69 with the material disposed on the under surface, as shown in Figs. 5 and 7, and passes through the rollers 74 and 75 onto the curling rollers 77 and 78 in such a manner that the material introduced thereon from the container 59 is on the side of said loaf in which direction it is rolled so that when said loaf is curled or rolled the flavoring material will be disposed interiorly thereof as shown in Fig. 5.

After passing from the curling rollers 77 and 78 the curled loaf falls upon the guide 79. As illustrated best in Fig. 2 the guide 79 is disposed in spaced relation with the periphery of a flattening roller 80. The flattening roller 80 is flanged as illustrated best in Fig. 3 and therefore the loaf is compressed into a suitable size while passing between said roller 80 and the guide 79. Preferably the roller 80 is grooved as illustrated in Fig. 3. In order to adjust the space between the guide members 79 and the roller 80 I mount said guide member 79 in the following manner. Suitably mounted in the frame 10 are shafts 81 and 82. On one end of the shaft 82 a member embodying a segment 83 is provided. An arm 84 is mounted on the corresponding end of shaft 81 and a link connects arm 84 and segment bearing member 83 so that movement of one of said members will be transmitted to the other. Members including arms 85 and 86 are fixedly mounted on shafts 81 and 82 and are pivotally connected to guide members 79 as illustrated in Fig. 2. Mounted on the frame 25 in suitable bearings is a shaft 87 which has a worm gear 88 thereon that is adapted to mesh with the segment on member 83. A hand wheel 89 is provided on the shaft 87 and by rotating said hand wheel the segment 83 may be actuated and therefore the arm 84 which in turn actuates shafts 81 and 82 and therefore arms 85 and 86 to move the guiding member 79 toward and away from the drum 80.

At the outer end of the guide member 79 the compressed and properly formed curled loaf is caused to pass through a series of knives 90 which cuts the loaf into a predetermined number of flat rolls which falls upon the conveyor belt 91 from which they are removed and carried to a suitable point to be baked.

It is apparent from the foregoing description that I have provided a machine in which a loaf of dough may be formed into a plurality of rolls. I have arranged the machine so that a suitable flavoring material such as cinnamon may be introduced onto the loaf and have arranged the device in such a way that the material introduced onto the loaf will be disposed interiorly of it when said loaf is curled. It is apparent that the entire operation is carried out automatically and that the rolls need not be touched by hand until they are to be introduced into an oven for baking. It is to be understood that many other substances other than cinnamon might be introduced onto the rolls, for example, raisins and still not depart from the purview of my invention.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what

I claim as new and desire to protect by Letters Patent is:

1. A dough forming machine including a dough supplying hopper, a pair of forming rollers disposed below said hopper, another pair of forming rollers disposed below said first named pair of forming rollers and offset from vertical alignment with said first named pair of forming rollers, a stationary guide member extending between said pairs of forming rollers, a housing disposed between said pairs of forming rollers and having an opening formed therein in the portion thereof aligned with said guide member, means for controlling passage through said opening, operating to permit movement of material from said housing onto a section of dough passing over said guide member, a conveyer member having the receiving end thereof disposed below said last named pair of forming rollers, and means disposed at the delivery end of said conveyer for acting on said section of dough after passage from said conveyer member.

2. A dough forming machine including a dough supplying hopper, a pair of forming rollers disposed below said hopper, another pair of forming rollers disposed below said first named pair of forming rollers and offset from vertical alignment with said first named pair of forming rollers, a stationary guide member extending between said pairs of forming rollers, a housing disposed above and between said pairs of forming rollers and having an opening therein in the portion thereof aligned with said guide member, means for controlling passage through said opening, operating to permit movement of material from said housing onto a section of dough passing over said guide member, an endless belt conveyer having the receiving end thereof disposed below said second named pair of forming rollers, a receiving member at the delivery end of said conveyer, and means for rolling said dough at the delivery end of said receiving member.

3. In a dough forming machine, a dough supplying hopper, a pair of forming rollers, a liquid containing housing having a downwardly projecting portion extended toward one roller of said pair of forming rollers, means for controlling passage through said downwardly projecting portion, another pair of forming rollers disposed below said first named pair of forming rollers out of vertical alignment therewith, a stationary guide member extending between said pairs of forming rollers disposed at an angle to the vertical with one face thereof disposed in an upward direction, a housing including a portion having a delivery opening therein, means for supporting said housing with said delivery opening aligned with said guide member, means for controlling passage through said delivery opening, means for controlling operation of said passage controlling means, operating to permit said passage controlling means to be moved to open position simultaneously with the passage of a section of dough over said guide member whereby material from said housing may be deposited on said section of dough, and conveyer means for receiving said section of dough after passage through said second named pair of forming rollers.

In testimony whereof I affix my signature.

DANIEL C. McCARTHY.